US012609467B2

(12) United States Patent
Dong et al.

(10) Patent No.: US 12,609,467 B2
(45) **Date of Patent: *Apr. 21, 2026**

(54) ELECTRICAL CONNECTION ASSEMBLY AND ELECTRICAL CONNECTION DEVICE

(71) Applicant: Tyco Electronics (Shanghai) Co., Ltd., Shanghai (CN)

(72) Inventors: Litao Dong, Shanghai (CN); Xiao (Nichee) Zhou, Shanghai (CN); Ziwei (Vivi) Li, Shanghai (CN); Yu Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 294 days.

This patent is subject to a terminal disclaimer.

(21) Appl. No.: 18/242,668

(22) Filed: Sep. 6, 2023

(65) Prior Publication Data

US 2024/0079801 A1 Mar. 7, 2024

(30) Foreign Application Priority Data

Sep. 6, 2022 (CN) ........................ 202211082502.4

(51) Int. Cl.
*H01R 12/58* (2011.01)
*H01R 12/62* (2011.01)

(52) U.S. Cl.
CPC .......... *H01R 12/585* (2013.01); *H01R 12/62* (2013.01)

(58) Field of Classification Search
CPC .............................. H01R 12/585; H01R 12/62
USPC .......................................................... 361/749
See application file for complete search history.

(56) References Cited

U.S. PATENT DOCUMENTS

| | | | | |
|---|---|---|---|---|
| 7,833,026 B1 * | 11/2010 | Morgan | H01R 12/722 439/607.05 |
| 2012/0113602 A1 * | 5/2012 | Zhang | H01R 12/724 439/55 |
| 2012/0176756 A1 * | 7/2012 | Gailus | H01R 24/64 361/752 |
| 2022/0076625 A1 * | 3/2022 | Lee | G09G 3/3233 |

* cited by examiner

*Primary Examiner* — Andargie M Aychillhum
(74) *Attorney, Agent, or Firm* — Barley Snyder

(57) ABSTRACT

An electrical connection assembly includes a first insulator, a first connection terminal fixed to the first insulator and including a first press fitting part and a first connection part, and a flexible connection member including a connection conductor. The first connection part is connected to a first end of the connection conductor to be electrically connected to the flexible connection member. The first press fitting part is pressed into a first hole of a first circuit board to be electrically connected to the first circuit board.

20 Claims, 10 Drawing Sheets

ELECTRICAL CONNECTION ASSEMBLY AND ELECTRICAL CONNECTION DEVICE

CROSS-REFERENCE TO RELATED APPLICATION

This application claims the benefit of the filing date under 35 U.S.C. § 119(a)-(d) of Chinese Patent Application No. 202211082502.4, filed on Sep. 6, 2022.

FIELD OF THE INVENTION

The present invention relates to an electrical connection assembly and an electrical connection device comprising the electrical connection assembly.

BACKGROUND

There are usually two solutions for the electrical connection between circuit boards. One solution is typically to connect the circuit boards by connectors, such as a board end connector on the circuit board and a cable end connector on the cable. The board end connector is mated with the cable end connector. However, this solution requires the provision of two board end connectors and two cable end connectors, resulting in higher costs. The other solution is to electrically connect two circuit boards using a flexible flat cable (FFC) or flexible printed circuit board (FPC), which is directly soldered to the circuit board. However, the welding of flexible flat cable (FFC) or flexible printed circuit board (FPC) is relatively difficult.

SUMMARY

An electrical connection assembly includes a first insulator, a first connection terminal fixed to the first insulator and including a first press fitting part and a first connection part, and a flexible connection member including a connection conductor. The first connection part is connected to a first end of the connection conductor to be electrically connected to the flexible connection member. The first press fitting part is pressed into a first hole of a first circuit board to be electrically connected to the first circuit board.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
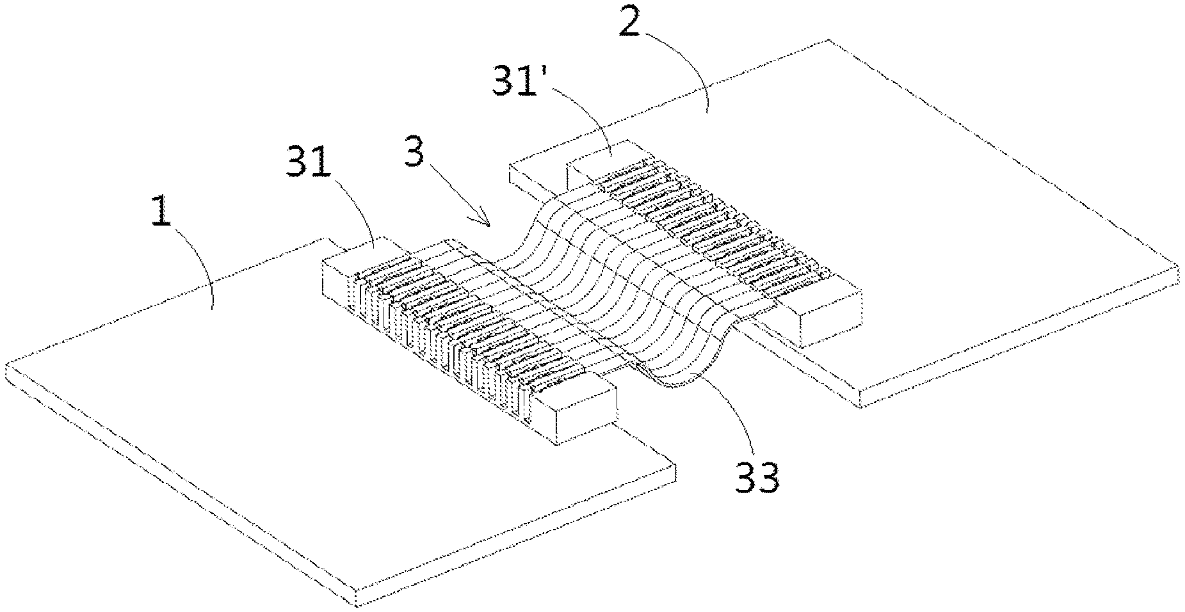
FIG. 1 shows an illustrative perspective view of an electrical connection device according to an exemplary embodiment of the present invention when viewed from the top.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
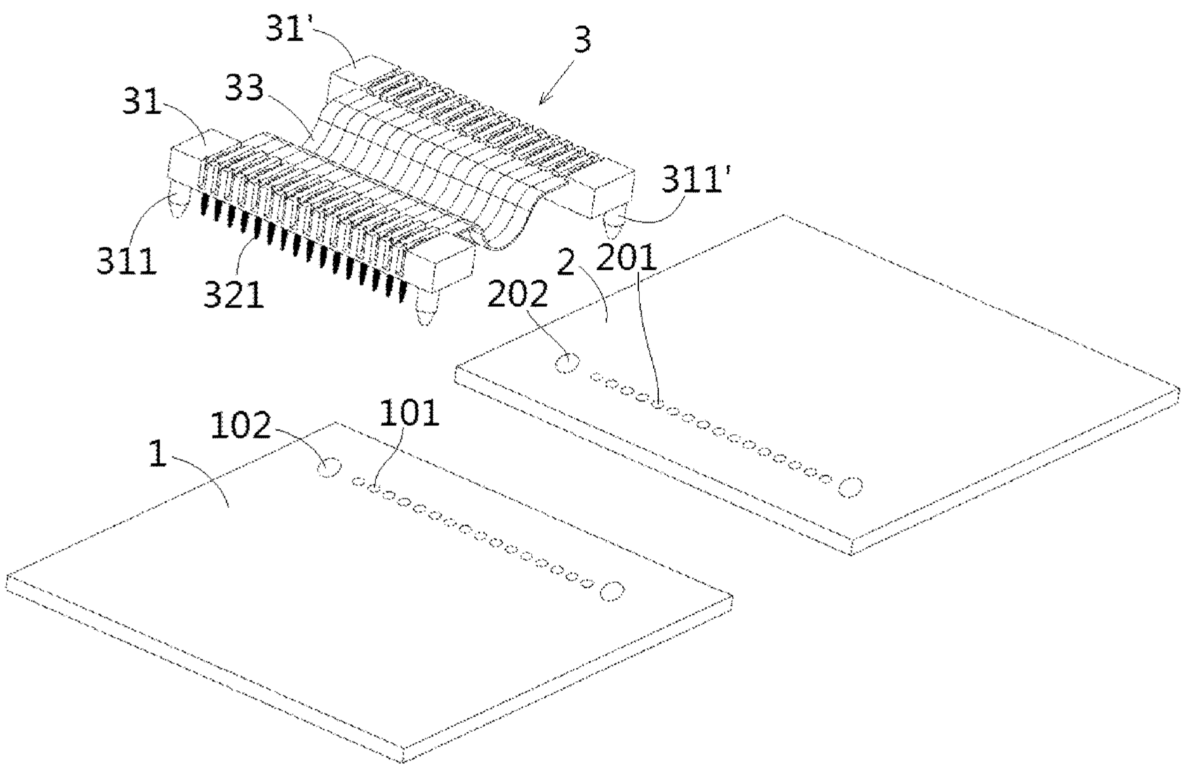
FIG. 2 shows an illustrative exploded perspective view of an electrical connection device according to an exemplary embodiment of the present invention when viewed from the top.
Figure 3:
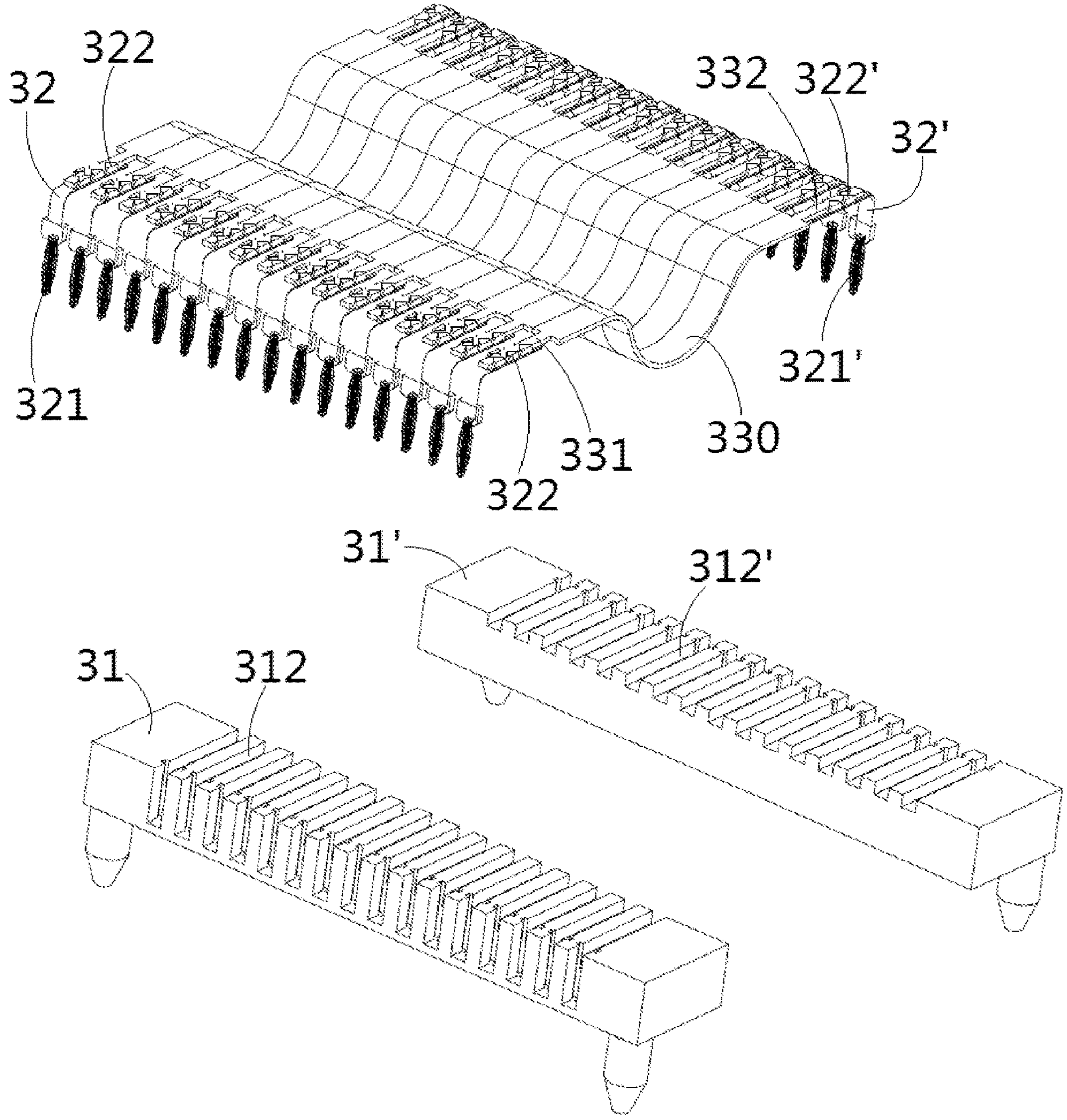
FIG. 3 shows an illustrative exploded perspective view of an electrical connection assembly according to an exemplary embodiment of the present invention when viewed from the top.

FIG. 1 shows an illustrative perspective view of an electrical connection device according to an exemplary embodiment of the present invention when viewed from the top. FIG. 2 shows an illustrative exploded view of the electrical connection device according to an exemplary embodiment of the present invention when viewed from the top. FIG. 3 shows an illustrative exploded view of an electrical connection assembly according to an exemplary embodiment of the present invention when viewed from the top.

As shown in FIGS. 1 to 3, in an exemplary embodiment of the present invention, an electrical connection device is disclosed. The electrical connection device includes a first circuit board 1, a second circuit board 2, and an electrical connection assembly 3 electrically connected between the first circuit board 1 and the second circuit board 2.

Figure 4:
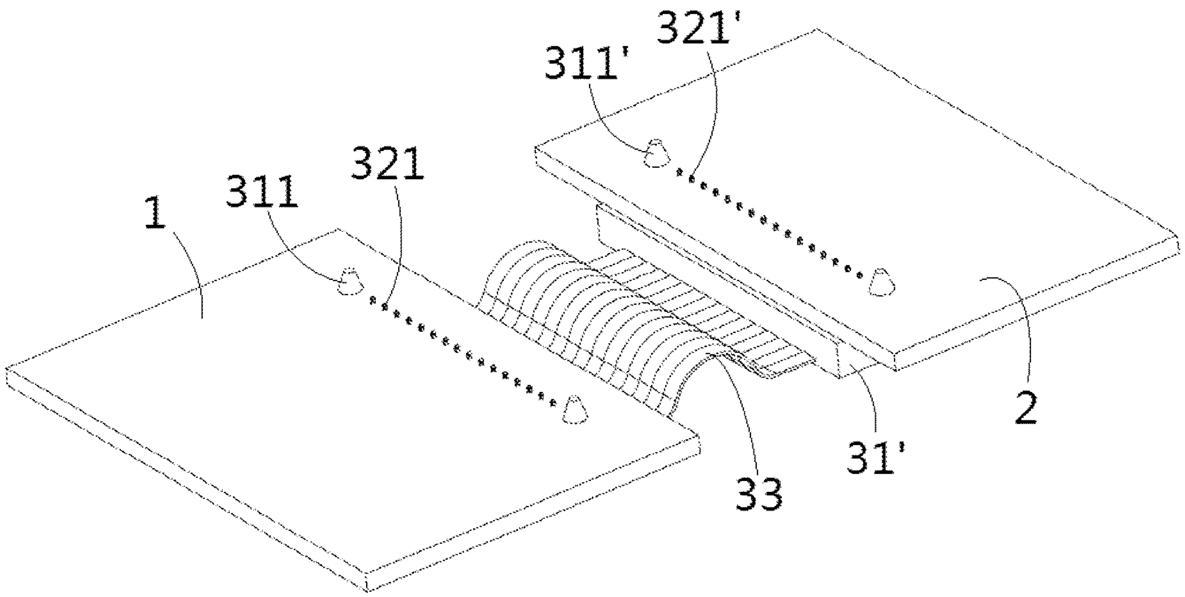
FIG. 4 shows an illustrative perspective view of an electrical connection device according to an exemplary embodiment of the present invention when viewed from the bottom.
Figure 5:
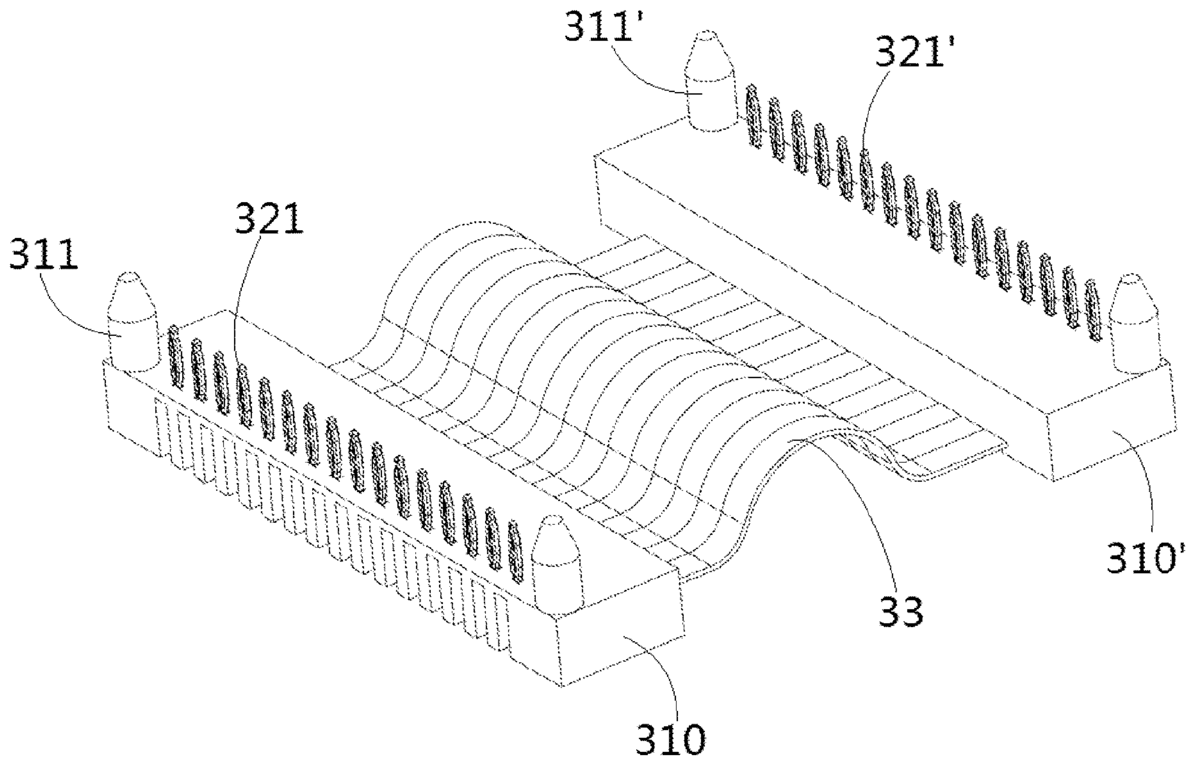
FIG. 5 shows an illustrative perspective view of an electrical connection assembly according to an exemplary embodiment of the present invention when viewed from the bottom.
Figure 6:
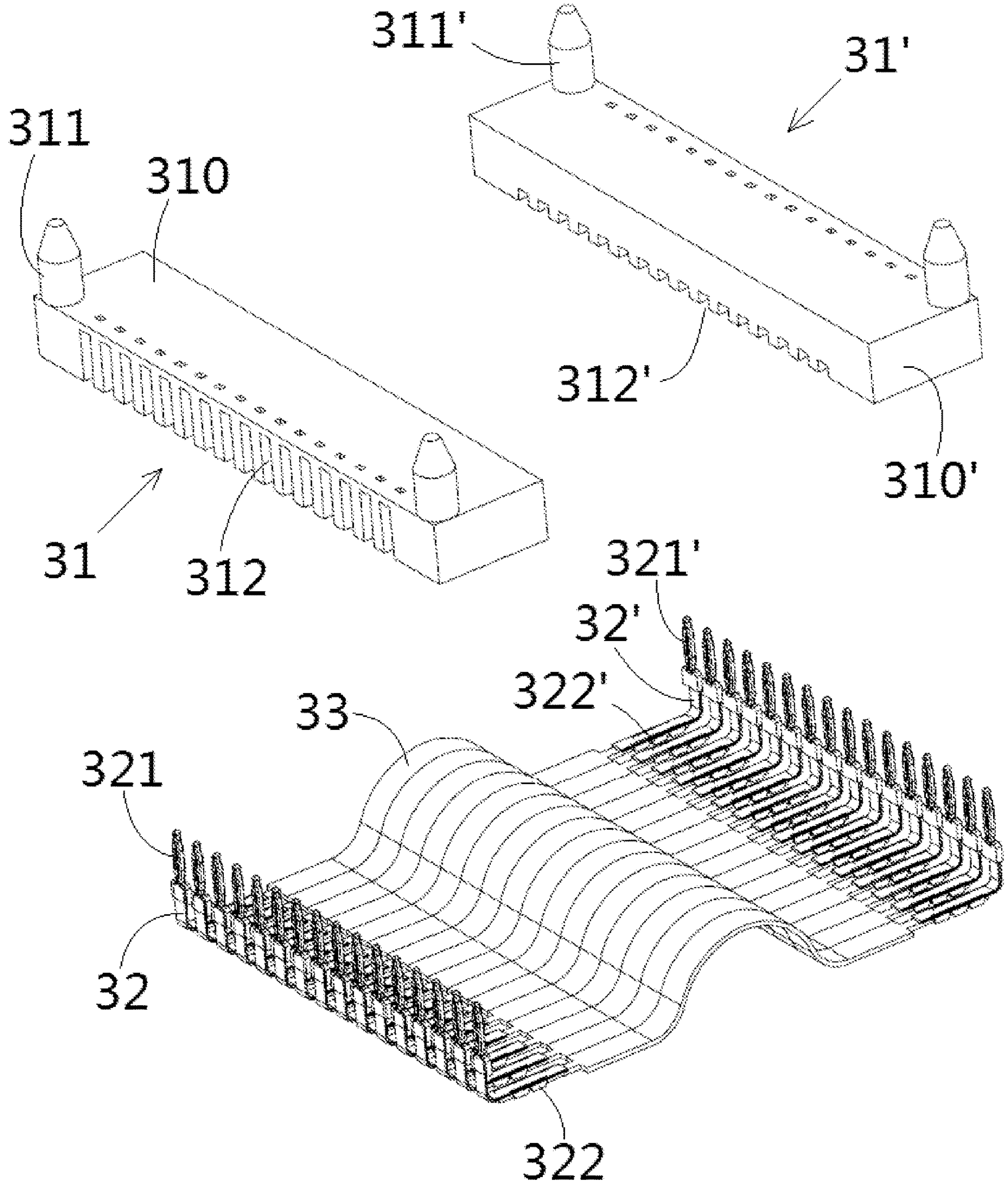
FIG. 6 shows an illustrative exploded perspective view of an electrical connection assembly according to an exemplary embodiment of the present invention when viewed from the bottom.
Figure 7:
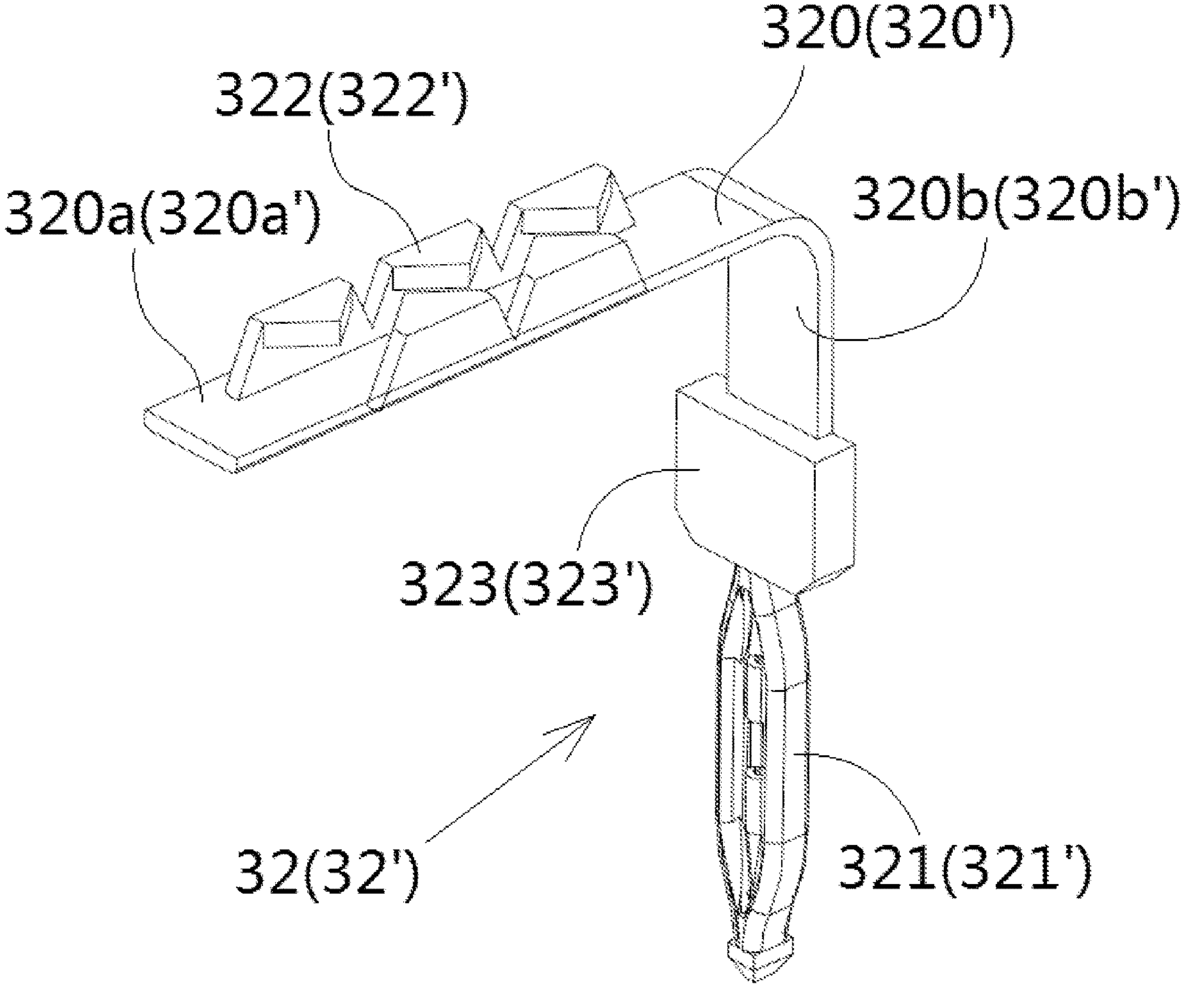
FIG. 7 shows an illustrative perspective view of the first and second connection terminals of the electrical connection assembly according to an exemplary embodiment of the present invention.
Figure 8:
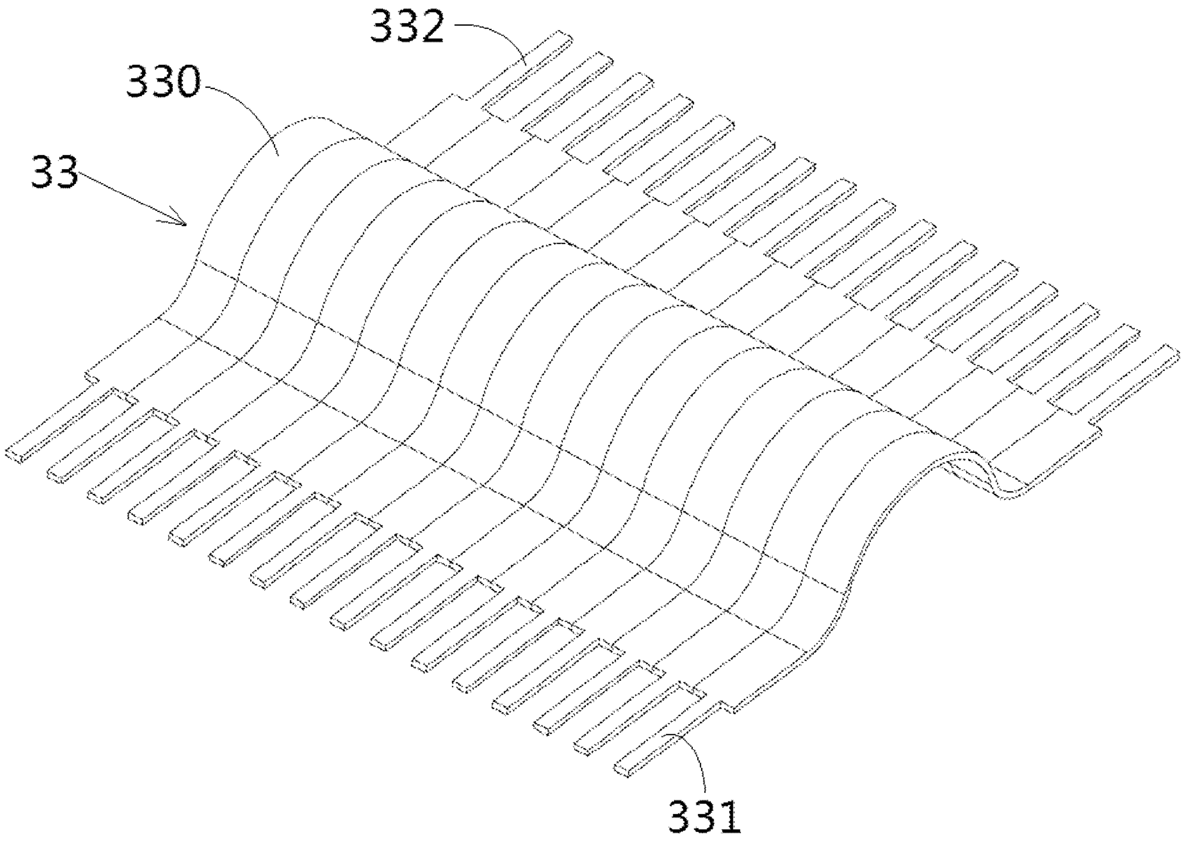
FIG. 8 shows an illustrative perspective view of a flexible connection member according to an exemplary embodiment of the present invention.

FIG. 4 shows an illustrative perspective view of the electrical connection device according to an exemplary embodiment of the present invention when viewed from the bottom. FIG. 5 shows an illustrative perspective view of the electrical connection assembly 3 according to an exemplary embodiment of the present invention when viewed from the bottom. FIG. 6 shows an illustrative exploded view of the electrical connection assembly 3 according to an exemplary embodiment of the present invention when viewed from the bottom. FIG. 7 shows an illustrative perspective view of the first connection terminal 32 and the second connection terminal 32' of the electrical connection assembly 3 according to an exemplary embodiment of the present invention. FIG. 8 shows an illustrative perspective view of a flexible connection member 33 according to an exemplary embodiment of the present invention.

The electrical connection assembly 3 includes a first insulator 31, a first connection terminal 32, and a flexible connection member 33, as shown in FIGS. 1 to 3. The first connection terminal 32 is fixed to the first insulator 31 and includes a first press fitting part 321 and a first connection part 322. The flexible connection member 33 includes a connection conductor 330. The first connection part 322 is crimped onto the first end 331 of the connection conductor 330 to be electrically connected to the flexible connection member 33. The first press fitting part 321 is adapted to be pressed into a first hole 101 in the first circuit board 1 to be electrically connected to the first circuit board 1. A press fitting is a welding free connection, and therefore, compared to welding, press fitting operation has the advantages of simplicity and speed.

In the illustrated embodiments, the flexible connection member 33 can be a flexible flat cable (FFC) or a flexible printed circuit board (FPC).

In the illustrated embodiment, the first insulator 31 includes a first body part 310 and a first slot 312, as shown in FIG. 6. The first slot 312 is formed on the first body part 310. The first connection terminal 32 is installed in the first slot 312, and the first press fitting part 321 extends out of the first body part 310 to be pressed into the first hole 101 of the first circuit board 1.

The first connection part 322 of the first connection terminal 32 and the first end 331 of the connection conductor 330 are accommodated in the first slot 312 of the first insulator 31. However, the present invention is not limited to the illustrated embodiments, for example, the first connection part 322 of the first connection terminal 32 and the first end 331 of the connection conductor 330 can be located outside the first insulator 31.

As shown in FIG. 7, in the illustrated embodiment, the first connection terminal 32 further includes a first connection body 320 and a first fixing part 323. The first connection body 320 is at least partially accommodated in the first slot 312. The first fixing part 323 is connected to the first connection body 320 and fixed in the first slot 312. The first press fitting part 321 is connected to the first fixing part 323, and the first connection part 322 is connected to the first connection body 320. In the illustrated embodiment, the first connection body 320 is L-shaped, including a first horizontal extension part 320*a* and a first vertical extension part 320*b* that are vertically connected to each other. The first fixing part 323 is connected to the end of the first vertical extension part 320*b*, and the first connection part 322 is connected to the first horizontal extension part 320*a*.

As shown in FIG. 3, in the illustrated embodiment, the first connection part 322 is suitable for being crimped onto the first end 331 of the connection conductor 330. The first connection part 322 includes multiple first wings 322 arranged at both sides of the first horizontal extension part 320*a*, and the multiple first wings 322 are crimped onto the first end 331 of the connection conductor 330. However, the present invention is not limited to the illustrated embodiments, for example, the first connection part 322 can also be welded or riveted to the first end 331 of the connection conductor 330.

As shown in FIGS. 2 and 4, in the illustrated embodiments, the first insulator 31 also includes a first positioning post 311, which is formed on the first body part 310 for insertion into a first positioning hole 102 of the first circuit board 1.

In the illustrated embodiment, the first connection terminal 32 is an integral stamped terminal, and the first connection terminal 32 is L-shaped.

In the illustrated embodiment, the first insulator 31 and the first connection terminal 32 are separate independent components, and the first connection terminal 32 is inserted into the first slot 312 of the first insulator 31. However, the present invention is not limited to the illustrated embodiments. For example, in another exemplary embodiment of the present invention, the first insulator 31 may be an injection molded part formed on the first connection terminal 32, so that the first insulator 31 and the first connection terminal 32 are formed into an integral piece.

In the illustrated embodiment, the first press fitting part 321 of the first connection terminal 32 is in a fisheye shape, as shown in FIG. 7.

As shown in FIG. 3, in the illustrated embodiment, the electrical connection assembly 3 further includes a second insulator 31' and a second connection terminal 32'. The second connection terminal 32' is fixed to the second insulator 31' and includes a second press fitting part 321' and a second connection part 322'. The second connection part 322' is connected to the second end 332 of the connection conductor 330 to be electrically connected to the flexible connection member 33. The second press fitting part 321' is adapted to be pressed into a second hole 201 of the second circuit board 2 to be electrically connected to the second circuit board 2. In the illustrated embodiment, the second connection part 322' is crimped onto the second end 332 of the connection conductor 330. However, the present invention is not limited to the illustrated embodiments, for example, the second connection part 322' can be welded or riveted to the second end 332 of the connection conductor 330.

As shown in FIG. 3, in the illustrated embodiments, the electrical connection assembly includes a row of first connection terminals 32 and a row of second connection terminals 32', and the flexible connection member 33 includes a row of connection conductors 330. The first connection parts 322 of a row of first connection terminals 32 are respectively crimped onto the first ends 331 of a row of connection conductors 330. The first press fitting parts 321 of a row of first connection terminals 32 are adapted to be respectively pressed into a row of first holes 101 of the first circuit board 1. The second connection parts 322' of a row of second connection terminals 32' are respectively crimped onto the second ends 332 of a row of connection conductors 330. The second press fitting parts 321' of a row of second connection terminals 32' are adapted to be respectively pressed into a row of second holes 201 of the second circuit board 2.

In the illustrated embodiment, the second insulator 31' is identical to the first insulator 31, allowing for the interchangeable use of the second insulator 31' and the first insulator 31. The second connection terminal 32' is identical to the first connection terminal 32, allowing the second connection terminal 32' and the first connection terminal 32 to be interchangeable.

As shown in FIGS. 5 and 6, in the illustrated embodiment, the second insulator 31' includes a second body part 310' and a second slot 312'. The second slot 312' is formed on the second body part 310'. The second connection terminal 32' is installed in the second slot 312', and the second press fitting part 321' extends out of the second body part 310' to be pressed into the second hole 201 of the second circuit board 2.

In the illustrated embodiment, the second connection part 322' of the second connection terminal 32' and the second end 332 of the connection conductor 330 are accommodated in the second slot 312' of the second insulator 31'. However, the present invention is not limited to the illustrated embodiments, for example, the second connection part 322' of the second connection terminal 32' and the second end 332 of the connection conductor 330 can be located outside the second insulator 31'.

As shown in FIG. 7, in the illustrated embodiment, the second connection terminal 32' further includes a second connection body 320' and a second fixing part 323'. The second connection body 320' is accommodated in the second slot 312'. The second fixing part 323' is connected to the second connection body 320' and is fixed in the second slot 312'. The second press fitting part 321' is connected to the second fixing part 323', and the second connection part 322' is connected to the second connection body 320'.

In the illustrated embodiment, the second connection body 320' is L-shaped, including a second horizontal extension part **320*a*' and a second vertical extension part 320*b*' that are vertically connected to each other. The second fixing part 323' is connected to the end of the second vertical extension part 320*b*', and the second connection part 322' is connected to the second horizontal extension part 320*a*'. In the illustrated embodiments, the second connection part 322' includes multiple second wings 322' arranged at both sides of the second horizontal extension part 320*a*', and the multiple second wings 322' are crimped onto the second end 332 of the connection conductor 330**.

As shown in FIGS. 2 and 4, in the illustrated embodiments, the second insulator 31' also includes a second positioning post 311', which is formed on the second body part 310' for insertion into a second positioning hole 202' of the second circuit board 2.

In the illustrated embodiment, the second connection terminal 32' is an integral stamped terminal, and the second connection terminal 32' is L-shaped.

In the illustrated embodiments, the second insulator 31' and the second connection terminal 32' are separate independent components, and the second connection terminal 32' is inserted into the second slot 312' of the second insulator 31'. However, the present invention is not limited to the illustrated embodiments. For example, in another exemplary embodiment of the present invention, the second insulator 31' may be an injection molded part formed on the second connection terminal 32', so that the second insulator 31' and the second connection terminal 32' are formed into an integral piece.

In the illustrated embodiment, the second press fitting part 321' of the second connection terminal 32' is in a fisheye shape, as shown in FIG. 7.

Figure 9:
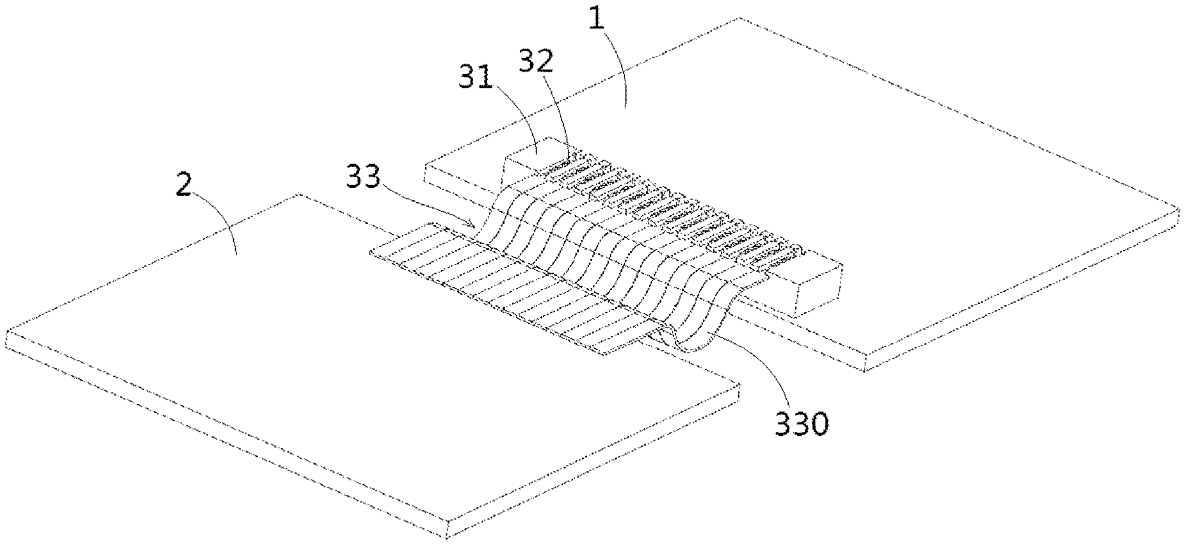
FIG. 9 shows an illustrative perspective view of an electrical connection assembly according to another exemplary embodiment of the present invention.

FIG. 9 shows an illustrative perspective view of the electrical connection assembly 3 according to another exemplary embodiment of the present invention. The main difference between the electrical connection assembly 3 shown in FIG. 9 and the electrical connection assembly 3 shown in FIGS. 1-8 is the removal of the second insulator 31' and the second connection terminal 32'.

As shown in FIG. 9, in the illustrated embodiment, the second end 332 of the connection conductor 330 is directly and electrically connected to the second circuit board 2. For example, the second end 332 of the connection conductor 330 can be welded, crimped, or riveted to the second circuit board 2.

Figure 10:
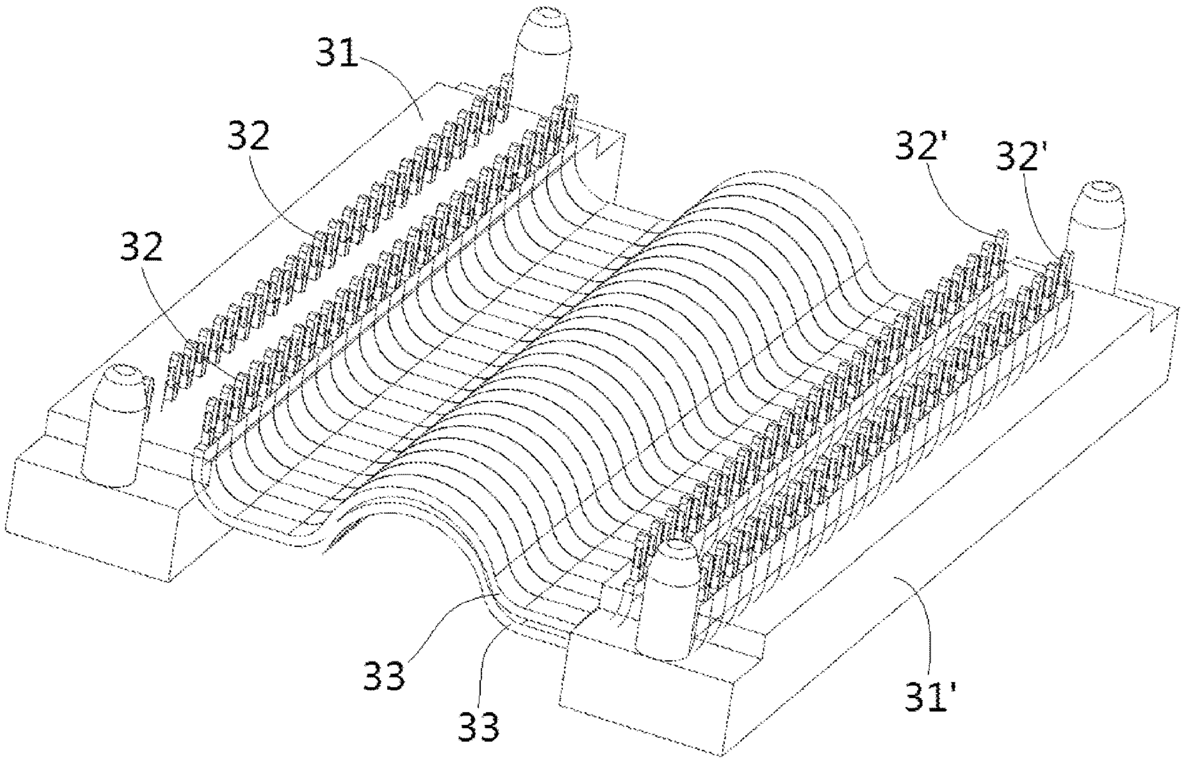
FIG. 10 shows an illustrative perspective view of an electrical connection assembly according to another exemplary embodiment of the present invention.

FIG. 10 shows an illustrative perspective view of the electrical connection assembly 3 according to another exemplary embodiment of the present invention. The main difference between the electrical connection assembly 3 shown in FIG. 10 and the electrical connection assembly 3 shown in FIGS. 1-8 is the number and arrangement of the first connection terminals 32, the second connection terminals 32', and the flexible connection members 33.

As shown in FIG. 10, in the illustrated embodiment, the electrical connection assembly includes multiple rows of first connection terminals 32 and multiple rows of second connection terminals 32'. The electrical connection assembly includes multiple flexible connection members 33 stacked up and down, each of which includes a row of connection conductors 330. The first connection parts 322 of each row of first connection terminals 32 are respectively crimped to the first ends 331 of a row of connection conductors 330 of the corresponding flexible connection member 33, and the first press fitting parts 321 of each row of first connection terminals 32 are adapted to be respectively pressed into the corresponding row of first holes 101 of the first circuit board 1. The second connection parts 322' of a row of second connection terminals 32' are respectively crimped to the second ends 332 of a row of connection conductors 330 of the corresponding flexible connection member 33, and the second press fitting part 321' of a row of second connection terminals 32' are adapted to be respectively pressed into the corresponding row of second holes 201 of the first circuit board 1.

In another exemplary embodiment of the present invention, an electrical connection device is also disclosed. The electrical connection device includes: the aforementioned electrical connection assembly 3 and the first circuit board 1. A first hole 101 is formed in the first circuit board 1. The first press fitting part 321 of the first connection terminal 32 of the electrical connection assembly 3 is pressed into the first hole 101 of the first circuit board 1.

As shown in FIGS. 1-8 and 10, in the illustrated embodiment, the electrical connection device further includes a second circuit board 2, in which a second hole 201 is formed. The second press fitting part 321' of the second connection terminal 32' of the electrical connection assembly 3 is pressed into the second hole 201 of the second circuit board 2.

As shown in FIG. 9, in the illustrated embodiment, the electrical connection device further includes a second circuit board 2. The second end 332 of the connection conductor 330 of the flexible connection member 33 is directly and electrically connected to the second circuit board 2.

In the aforementioned exemplary embodiments of the present invention, the electrical connection assembly can achieve flexible electrical connection between two circuit boards, and the electrical connection assembly has a simple structure and low cost.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connection assembly, comprising:

a first insulator including a first body part and a first slot formed on the first body part;

a first connection terminal fixed to the first insulator and installed in the first slot, and including a first press fitting part and a first connection part; and a flexible connection member including a connection conductor, the first connection part is connected to a first end of the connection conductor to be electrically connected to the flexible connection member, the first press fitting part extends out of the first body part and is pressed into a first hole of a first circuit board to be electrically connected to the first circuit board.

2. The electrical connection assembly according to claim 1, wherein the flexible connection member is a flexible flat cable or a flexible printed circuit board.

3. The electrical connection assembly according to claim 1, wherein the first connection part of the first connection terminal and the first end of the connection conductor are accommodated in the first slot of the first insulator.

4. The electrical connection assembly according to claim 1, wherein the first connection part of the first connection terminal and the first end of the connection conductor are located outside the first insulator.

5. The electrical connection assembly according to claim 1, wherein the first connection terminal includes a first connection body at least partially accommodated in the first slot and a first fixing part connected to the first connection body and fixed in the first slot, the first press fitting part is connected to the first fixing part, and the first connection part is connected to the first connection body.

6. The electrical connection assembly according to claim 5, wherein the first connection body is L-shaped, including a first horizontal extension part and a first vertical extension part that are connected to each other, and the first fixing part is connected to an end of the first vertical extension part, the first connection part is connected to the first horizontal extension part.

7. The electrical connection assembly according to claim 6, wherein the first connection part is crimped onto the first end of the connection conductor, and the first connection part includes a plurality of first wings arranged at both sides of the first horizontal extension part, the first wings are crimped onto the first end of the connection conductor.

8. The electrical connection assembly according to claim 1, wherein the first insulator includes a first positioning post formed on the first body part for insertion into a first positioning hole of the first circuit board.

9. The electrical connection assembly according to claim 1, wherein the first insulator is an injection molded part formed on the first connection terminal, the first insulator and the first connection terminal are formed into an integral piece.

10. The electrical connection assembly according to claim 1, wherein the first press fitting part of the first connection terminal is in the shape of a fish eye.

11. The electrical connection assembly according to claim 1, wherein a second end of the connection conductor is directly and electrically connected to a second circuit board.

12. The electrical connection assembly according to claim 11, wherein the second end of the connection conductor of the flexible connection member is welded, crimped, or riveted to the second circuit board.

13. An electrical connection assembly, comprising:

a first insulator;

a first connection terminal fixed to the first insulator and including a first press fitting part and a first connection part;

a flexible connection member including a connection conductor, the first connection part is connected to a first end of the connection conductor to be electrically connected to the flexible connection member, the first press fitting part is pressed into a first hole of a first circuit board to be electrically connected to the first circuit board;

a second insulator; and a second connection terminal fixed to the second insulator, the second connection terminal includes a second press fitting part and a second connection part, the second connection part is connected to a second end of the connection conductor to be electrically connected to the flexible connection member, the second press fitting part is pressed into a second hole of a second circuit board to be electrically connected to the second circuit board.

14. The electrical connection assembly according to claim 13, wherein the first connection terminal is one of a plurality of first connection terminals in a row and the second connection terminal is one of a plurality of second connection terminals in a row, the connection conductor is one of a plurality of connection conductors of the flexible connection member arranged in a row, the first connection parts of the row of first connection terminals are respectively crimped onto a plurality of first ends of the row of connection conductors, the first press fitting parts of the row of first connection terminals are respectively pressed into a row of first holes of the first circuit board, the second connection parts of the row of second connection terminals are respectively crimped onto a plurality of second ends of the row of connection conductors, and the second press fitting parts of the row of second connection terminals are respectively pressed into a row of second holes of the second circuit board.

15. The electrical connection assembly according to claim 13, wherein the first connection terminal is one of a plurality of first connection terminals in a plurality of rows and the second connection terminal is one of a plurality of second connection terminals in a plurality of rows, the flexible connection member is one of a plurality of flexible connection members stacked up and down, each flexible connection member includes a row of connection conductors, the first connection parts of each row of first connection terminals are respectively crimped onto a plurality of first ends of a row of connection conductors of the corresponding flexible connection member, and the first press fitting parts of each row of first connection terminals are respectively pressed into a corresponding row of first holes of the first circuit board, the second connection parts of each row of second connection terminals are respectively crimped onto a plurality of second ends of a row of connection conductors of the corresponding flexible connection member, and the second press fitting parts of each row of second connection terminals are respectively pressed into a corresponding row of second holes of the second circuit board.

16. The electrical connection assembly according to claim 13, wherein the second insulator is identical to the first insulator and is interchangeable with the first insulator, the second connection terminal is identical to the first connection terminal and is interchangeable with the first connection terminal.

17. An electrical connection device, comprising:

an electrical connection assembly, including:

a first insulator;

a first connection terminal fixed to the first insulator and including a first press fitting part and a first connection part;

a flexible connection member including a connection conductor, the first connection part is connected to a first end of the connection conductor to be electrically connected to the flexible connection member;

a second insulator; and a second connection terminal fixed to the second insulator, the second connection terminal includes a second press fitting part and a second connection part, the second connection part is connected to a second end of the connection conductor to be electrically connected to the flexible connection member; and a first circuit board having a first hole, the first press fitting part is pressed into the first hole to be electrically connected to the first circuit board, and the second press fitting part is adapted to be pressed into a second hole of a second circuit board.

18. The electrical connection device according to claim 17, further comprising a second circuit board formed with the second hole, the second press fitting part of the second connection terminal is pressed into the second hole of the second circuit board.

19. The electrical connection device according to claim 17, wherein the first insulator includes a first body part and a first slot formed on the first body part, the first connection terminal is installed in the first slot, the first press fitting part extends out of the first body part to be pressed into the first hole of the first circuit board.

20. An electrical connection assembly, comprising:

a first insulator;

a first connection terminal fixed to the first insulator and including a first press fitting part and a first connection part, the first insulator is an injection molded part formed on the first connection terminal, the first insulator and the first connection terminal are formed into an integral piece; and a flexible connection member including a connection conductor, the first connection part is connected to a first end of the connection conductor to be electrically connected to the flexible connection member, the first press fitting part is pressed into a first hole of a first circuit board to be electrically connected to the first circuit board.

* * * * *